United States Patent [19]
Harris et al.

[11] Patent Number: 5,501,415
[45] Date of Patent: Mar. 26, 1996

[54] METHOD AND APPARATUS FOR STORING AND DISPENSING A ROLL OF PHOTOGRAPHIC WEB

[75] Inventors: Clark E. Harris, Fairport; John A. Kappler, Macedon, both of N.Y.

[73] Assignee: Eastman Kodak Company, Rochester, N.Y.

[21] Appl. No.: 395,959

[22] Filed: Feb. 28, 1995

[51] Int. Cl.⁶ ................................................ B65H 16/06
[52] U.S. Cl. .................................... 242/596.7; 242/596.8; 206/409; 206/410
[58] Field of Search ............................. 242/598.3, 596.7, 242/596.8, 588.5, 588.6, 588.3, 588.4; 206/397, 409, 410; 53/409, 469, 204

[56] References Cited

U.S. PATENT DOCUMENTS

| | | | |
|---|---|---|---|
| 4,905,923 | 3/1990 | Dudley | 242/596.7 X |
| 5,105,604 | 4/1992 | Harris et al. | 53/409 |
| 5,161,685 | 11/1992 | Harris et al. | 206/397 |
| 5,195,689 | 3/1993 | Beer et al. | 242/588.6 |

*Primary Examiner*—John M. Jillons
*Attorney, Agent, or Firm*—Charles E. Snee, III

[57] ABSTRACT

A light-tight enclosure (10) for storing and dispensing a roll of photosensitive web material (32) directly in a cooperating apparatus without need for an auxiliary cartridge. The web is wound about a cylindrical core (34, 68, 74) having flush, closed opposite ends (36) and an axial bore (38) in each end. The core may be closed by integral ends or by fullfitting plugs (76). The enclosure comprises a flexible opaque bag (12) with opposite sidewalls (16) extending between opposing rearward and forward portions (18 and 20) and between opposing upper and lower portions (22 and 24). Each sidewall has a central aperture therein congruent with each core end. The rearward portion defines a closable opening for receiving the roll. A shallow neck portion (26) projects from the forward portion to an end (28) thereof defining an exit slot (30) for dispensing the web material. Mounting pins (40) are disposed in both axial bores and extend through the apertures in the sidewalls, and flanges (44) on the shafts (42) of the pins outside the bag capture the sidewall material light-tightly between the flanges and the ends of the cores. The mounting pins have shouldered portions (48) outboard of the flanges which are adapted to mate rotatably with saddles (64) in a storage and dispensing stand (52), which stand can be adapted to mate operationally with the dispensing region of a printing or processing machine.

11 Claims, 6 Drawing Sheets

METHOD AND APPARATUS FOR STORING AND DISPENSING A ROLL OF PHOTOGRAPHIC WEB

FIELD OF THE INVENTION

The invention relates generally to enclosing photosensitive material, and particularly to a method and an apparatus for light-tightly enclosing and dispensing a roll of photosensitive material.

BACKGROUND OF THE INVENTION

In the past, rolls of photosensitive film or paper web have been supplied in either of two ways. In one, the web has been enclosed within a light-tight paper bag to be removed prior to use; in the other, within an injection-molded disposable cartridge. Each container protects the sensitized roll therein from physical damage and exposure to light during storage, transport, and loading, or example, into a minilab machine or microfiche printer/processor. The disposable cartridge, however, is both costly and wasteful. In some applications, a paper bag container must be unloaded in the dark, in order to safely transfer its stock roll from the bag to a reusable cartridge or dispensing stand. Such work in the dark can be awkward and time-consuming, and the stock roll can be easily damaged or light-struck through mishandling. There has thus been a need for a practical, convenient, and reliable method of light-tightly enclosing a photosensitive film or paper stock roll in readiness for dispensing of web directly from the enclosure within the machine itself without resort to a dispensing cartridge, and preferably by an enclosure that is not only economical to make and use but also is readily recyclable for further use of its constituent parts.

U.S. Pat. Nos. 5,105,604 issued Apr. 21, 1992, and 5,161,685 issued Nov. 10, 1992, both issued to Harris et al. and hereby incorporated by reference, disclose method and apparatus for enclosing, storing, and dispensing a roll of photosensitive web material wound about a hollow cylindrical core having open opposite ends. The apparatus is intended for mounting on a mandrel in a minilab cartridge. The enclosure comprises a flexible opaque bag with opposite sidewalls extending between opposing rearward and forward portions and opposing upper and lower portions. Each sidewall has a central aperture therein congruent with each core end. The rearward portion defines a closable opening for receiving the roll. A shallow neck portion projects from the forward portion to an end thereof defining an exit slot for dispensing the web material. A collar fits tightly inside each core end, with an annular flange thereon facing axially outward. An annular ring is attachable to each collar in spaced, inward-facing relation to the flange. The roll is first positioned in the bag, through its closable opening, so that the web material extends into the neck portion and out through the exit slot, and so that a central portion of the collar at each core end projects outwardly through the adjacent sidewall aperture, witch its flange left inside the sidewall and facing an annular portion thereof surrounding the aperture. The annular ring is then attached to the outwardly projecting portion of the collar in closely spaced, inward-facing relation to the sidewall annular portion, which is thus loosely trapped between the flange and the ring. The bag opening is then closed, and the bag neck portion is folded back and secured against the bag forward portion.

The invention disclosed in '604 and '685 can function to enclose, store, and dispense photosensitive web from a dispensing cartridge. However, the combination of a core, two core extensions, two enclosure sidewalls, and two flanges can make the overall axial dimension of the assembled dispenser too large for the assembly to fit into some commercially-available, existing cartridges. Furthermore, changing web widths requires a different width cartridge for each desired web width. Furthermore, since the web is fully protected from light by the apparatus disclosed in the referenced patents, the cartridge itself is largely superfluous, being needed only as a hanger having a mandrel to support the roll of web on its hollow core and to allow it to unwind during use.

It is a principal object of the invention to provide an improved light-tight enclosure and dispensing stand for storing and dispensing photosensitive web in a minilab machine or a microfiche printer/processor.

SUMMARY OF THE INVENTION

Our invention is defined by the claims. The apparatus and method of the invention are useful in providing an enclosure, including a bag and cooperating core, mounting pins, and a dispensing stand for storing and dispensing a roll of photosensitive web; which enclosure is easy to assemble in the dark, provides a positive light-tight seal of the enclosure sidewall to the core-supporting means, and, when mounted on a dispensing stand or other bracket, can dispense web within a minilab machine or microfiche printer/processor, without the need for a external, auxiliary cartridge.

Briefly described, our invention includes a core having two flush ends, or alternatively a core assembly comprising a hollow core and two flush-ended core plugs. Photosensitive web is wound about the core conventionally. A flexible, opaque bag is provided substantially as disclosed in the above-referenced patents except that the sidewalls of the enclosure are not provided with openings for mounting of the roll on a mandrel, and the core does not protrude through the sidewall. Instead, the roll of web is stored in the bag whose sidewalls are unfeatured during manufacture of the enclosed roll. When the roll is to be readied for use by the customer, a mounting pin is inserted through each sidewall of the bag and coaxially into each end of the core, providing thereby an axle about which the roll may unwind within the bag to dispense web through the exit slot of the bag. In dispensing, the bag remains motionless while the roll rotates to unwind within the bag. The pierced sidewall material fits snugly around the shaft of the pin, preventing light from entering the enclosure. Preferably, the core has an axial bore in each end adapted to receive and retain the pin on the core axis, which bore can be located by an operator by feel through the sidewall of the bag. Preferably, each pin is full-fitting in the axial bore and has a shouldered portion adapted to be journaled in a slot or yoke of a dispensing stand or bracket and a head to ensure correct lateral (axial) positioning of the enclosed roll in the dispensing location. Preferably, for greater protection of the web from inadvertently becoming light-struck around the pins during placement of the roll into the minilab machine, each pin has a shaft flange which fits light-tightly against the outer surface of the sidewall when the pin is inserted into the core.

In a method in accordance with the invention, the dark assembly of a roll of web into the prepared bag consists of the known steps of inserting the roll into the bag through a closable opening in a rearward portion of the bag; positioning the roll within the bag so that the ends of the core are proximal to central regions of the opposite sidewalls; feeding the leading end of the web through the exit slot; and closing and securing the closable opening of the bag in known fashion. The ensuing light assembly steps include providing mounting pins, as described hereinabove, and a storage and dispensing stand or other bracket to support the roll in use; locating the axial bores in the ends of the cores; pressing the pins through the sidewalls of the bag and into the axial bores to a depth such that the shaft flanges press the sidewalls against the ends of the core within the bag; mounting the enclosed roll on the unwinding stand with the shoulders of the pins disposed in saddles or grooves on the stand; and placing the prepared roll and dispensing stand in a web conveying machine.

BRIEF DESCRIPTION OF THE DRAWINGS

The foregoing and other objectives, features, and advantages of the invention will be apparent from the following more particular description, including the presently preferred embodiment of the invention, as illustrated in the accompanying drawings in which.

DETAILED DESCRIPTION OF THE INVENTION

Our invention provides a flexible opaque enclosure and dispensing stand for storing and dispensing light-sensitive core-wound web material without the use of an auxiliary cartridge and without requiring transfer of the web material in a dark room or dark bag.

Figure 1:
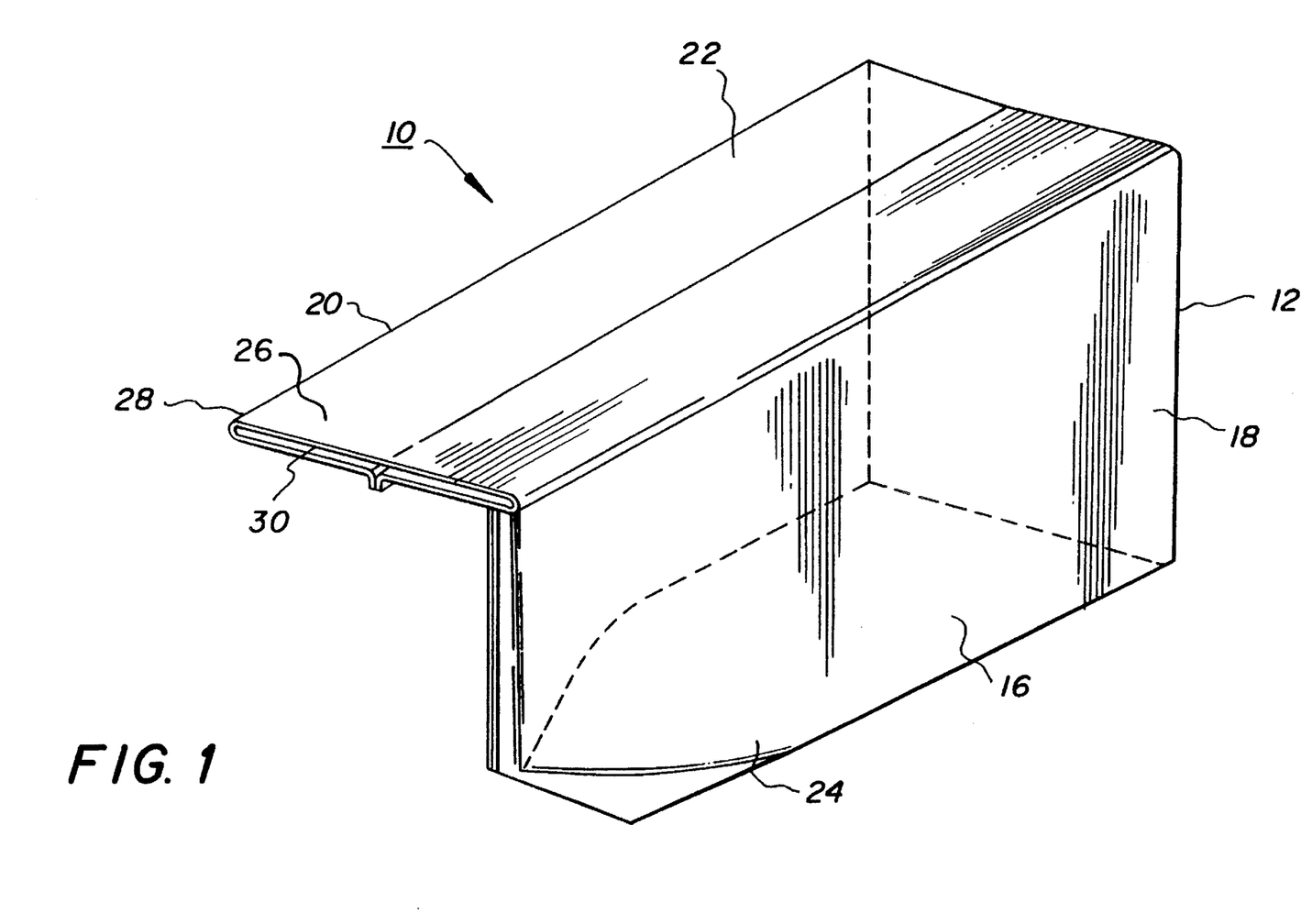
FIG. 1 is a perspective view depicting a flexible, opaque bag suitable for use in accordance with the invention.
Figure 2:
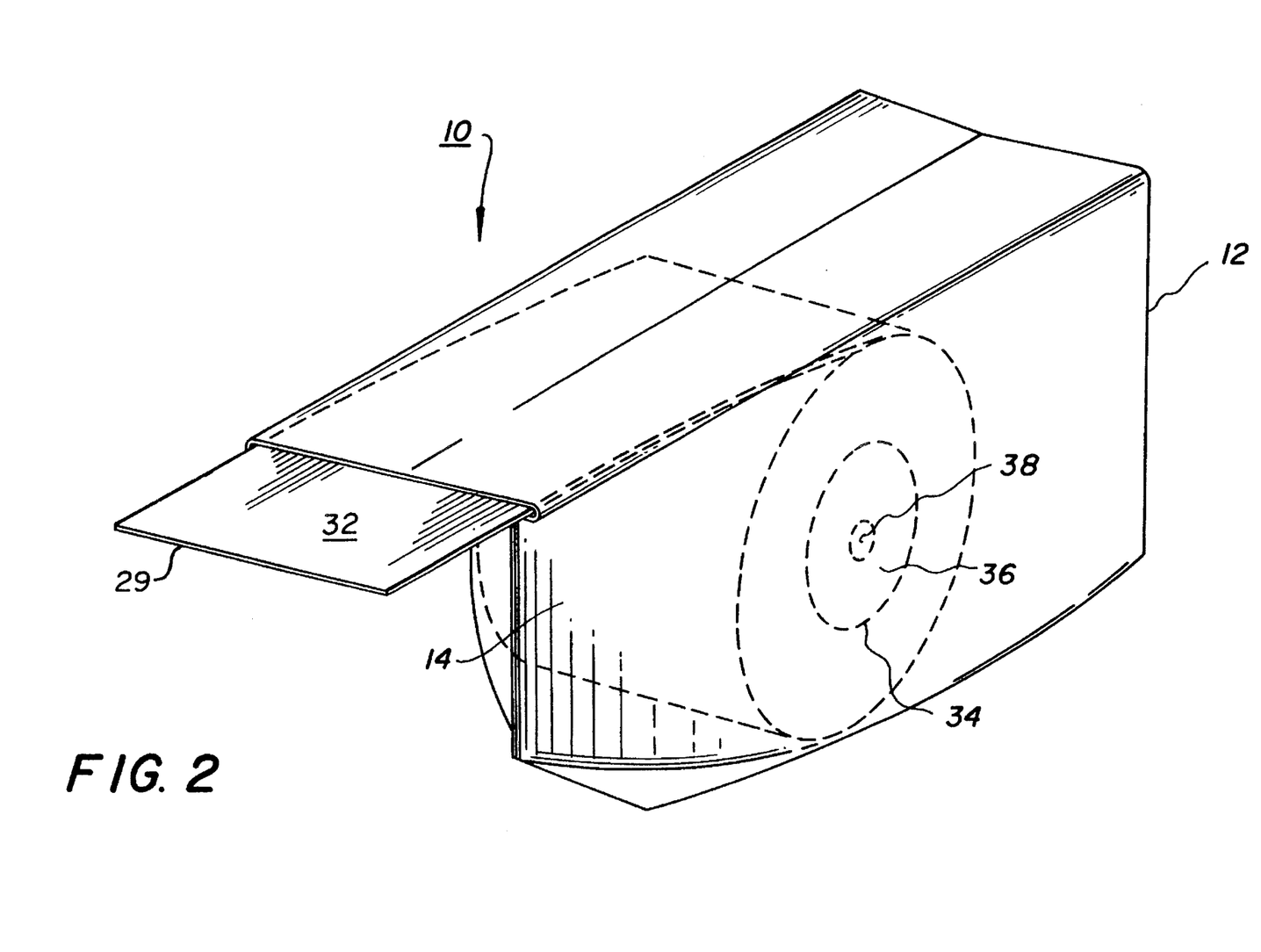
FIG. 2 is a perspective view showing a roll of photosensitive web installed in the bag of FIG. 1.

Referring to FIGS. 1 and 2, a flexible enclosure 10 of this invention is adapted to light-tightly store a photosensitive roll therein and dispense web material for use in, for example, a minilab photographic paper printing machine or a microfiche printer/processor. Enclosure 10 comprises a flexible opaque bag 12, preferably made from a thin, flexible, plastic, opaque sheet material such as high-density polyethylene approximately 0.005 inches (0.127 mm) thick. Configured to enclose roll 14, bag 12 includes a pair of opposite sidewalls 16 extending between opposing rearward and forward portions 18 and 20, respectively, and between opposing upper and lower portions 22 and 24, respectively. The bag rearward portion initially defines a closable opening through which roll 14 can be inserted into the bag. Bag 12 further includes a shallow neck portion 26 that projects forwardly from bag forward portion 20 to a distal end 28 thereof defining an exit slot 30 through which a strip of web material can be withdrawn from the bag. Roll 14 includes an elongate strip of web material 32 wound about a core 34 having a flush end 36 and preferably an axial bore 38 in end 36. Preferably, both ends of core 34 are so provided. The overall length of core 34 is substantially the same as the width of web 32. The outer diameter 37 of the core can be as convenient, for example, 1.50 inches. Core 34 can be formed from a wide variety of photo-inert materials, preferably plastic, for example, butyrate, PVC polymer, or high-density polyethylene.

Figure 3:
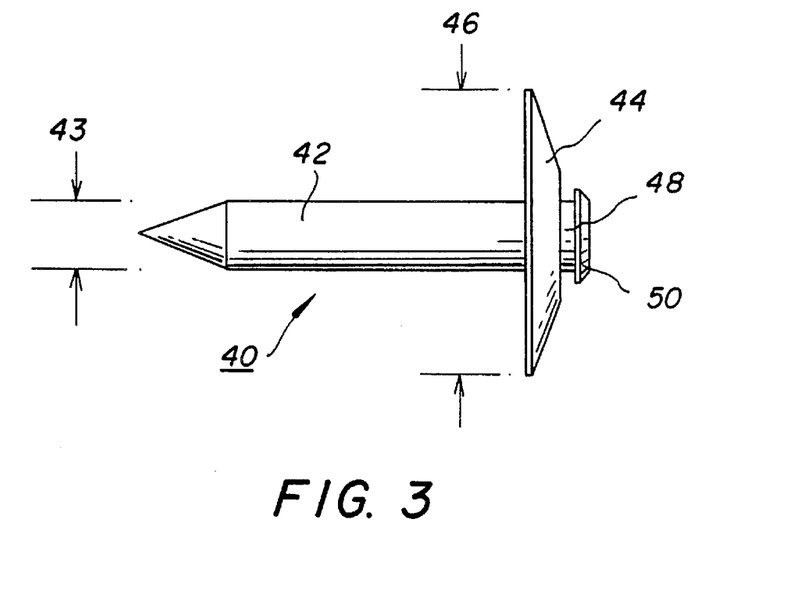
FIG. 3 is a side view of a preferred embodiment of a mounting pin.
Figure 4:
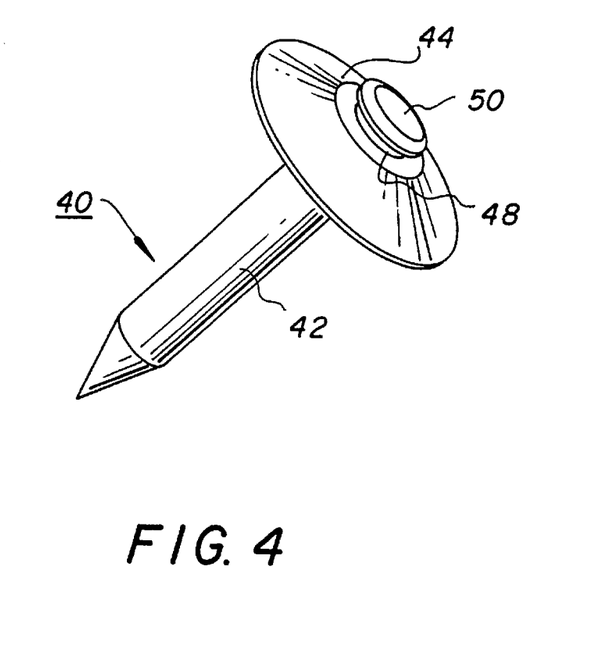
FIG. 4 is a perspective view of the mounting pin of FIG. 3.

A mounting pin 40, shown in FIGS. 3 and 4, is adapted to be inserted into bore 38 by piercing sidewall 16, the pierced opening of which then conforms light-tightly to cylindrical shaft 42 of pin 40 as the pin is further inserted into the core end. Preferably, the shaft diameter 43 is the same as, or slightly less than, the diameter 39 of bore 38 to ensure a snug fit but also to permit easy removal of the pins from the core during roll changes, for example a shaft diameter 43 of 0.290 inches (7.4 mm) can be used with a bore diameter 39 of 0.312 inches (7.9 mm). (Alternatively, the core end can be made from a soft but competent material such as rigid urethane or styrene foam and can be provided without bores 38, the pins forming their own bores as they are inserted. This embodiment is not preferred, since axial placement of the pins is difficult to realize.) Pin 40 is provided with a shaft flange 44 which limits the depth of insertion of the pin into the core. Flange 44 preferably has an outer diameter 46 the same as, or slightly less than, the core outer diameter 37, for example a flange diameter 46 of 1.250 inches (31 mm) can be used with a core diameter 37 of 1.500 inches (38 mm). When pin 40 is fully inserted into the core end, sidewall 16 is captured and firmly held light-tightly between flange 44 and end 36 of core 34. Preferably, both ends of core 34 are so treated. Pin 40 is also provided with a shaft shoulder 48 and cap 50 outboard of flange 42. The overall length of pin 40 is a matter of convenience, for example, 2.0 inches (51 mm). Pin 40 can be made by known molding or stamping means from a variety of metals or plastics such as steel, aluminum, butyrate, PVC polymer, or high-density polyethylene.

Figure 5:
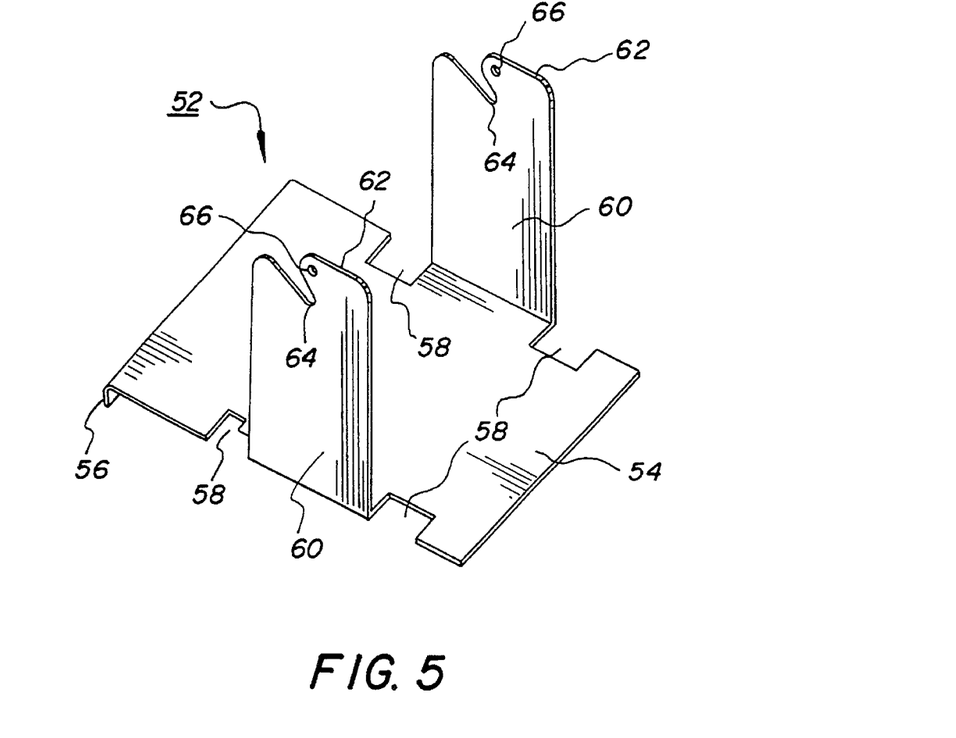
FIG. 5 is a perspective view of a preferred embodiment of a stand for mounting and dispensing the roll of web in a bag shown in FIG. 2.
Figure 6:
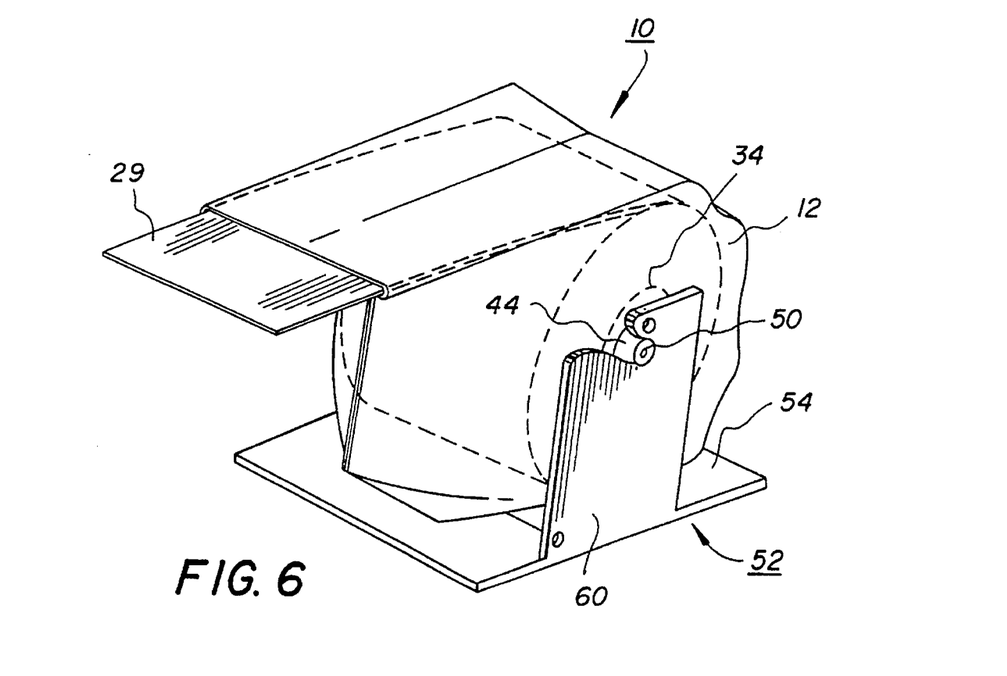
FIG. 6 is a perspective view of a roll of web in an opaque bag mounted on a dispensing stand in accordance with the invention.

The shaft shoulders 48 on opposite sides of enclosure 10 when pins 40 have been inserted into bores 38 provide convenient bearing surfaces for mounting of enclosure 10 to a storage and dispensing stand 52 shown in FIGS. 5 and 6 or to other brackets (not shown). Stand 52 has a base 54 which may be adapted as by a fold 56 or cutouts 58 to mate with components in the dispensing apparatus of a minilab machine (not shown), and a pair of substantially identical upright walls 60 configured at or near their upper ends 62 with saddles 64 adapted to receive shoulders 48, whereby roll 14 is suspended in proper position both laterally and vertically for enclosure 10 to dispense web 32 through slot 30, as shown in FIG. 6. Walls 60 can be provided with holes 66 to accommodate a removable carrying handle (not shown). Preferably walls 60 are spaced apart by a distance substantially the same as the distance between the shoulders on opposing pins. Stand 52 can be fabricated by, for example, stamping and folding from sheet metal or injection molding from plastic resin such as PVC or polycarbonate.

Figure 7:
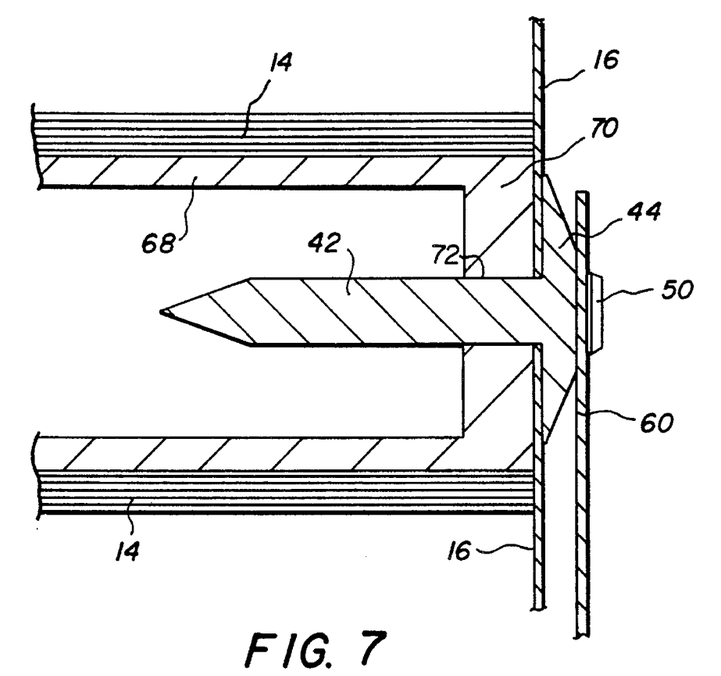
FIG. 7 is a cross-sectional view of a portion of the assembly shown in FIG. 6, showing a roll of photosensitive web having a closed, flush-ended core contained in an opaque bag and mounted by means of mounting pins on a dispensing stand in accordance with the invention.

The relationship among the various components in a preferred embodiment of the invention is shown more clearly in FIG. 7. A hollow core 68 is shown having an integral flush end 70 with a bore 72 therein.

Figure 8:
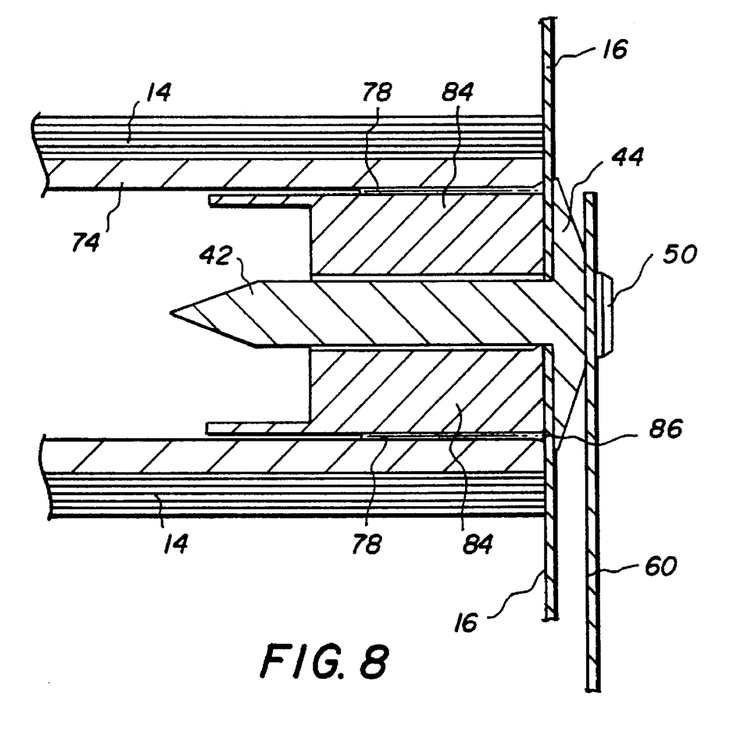
FIG. 8 is a cross-sectional view like FIG. 7, showing a roll having a hollow, open-ended core being pin-mounted through use of a flush-ended core insert.
Figure 9:
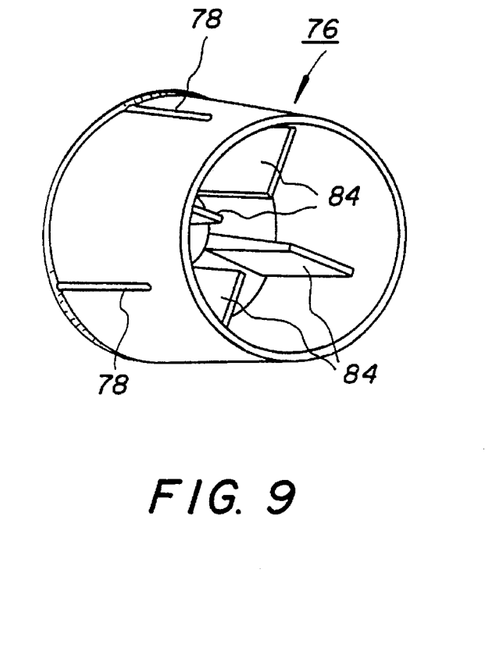
FIG. 9 is a perspective view of a core insert in accordance with the invention.
Figure 10:
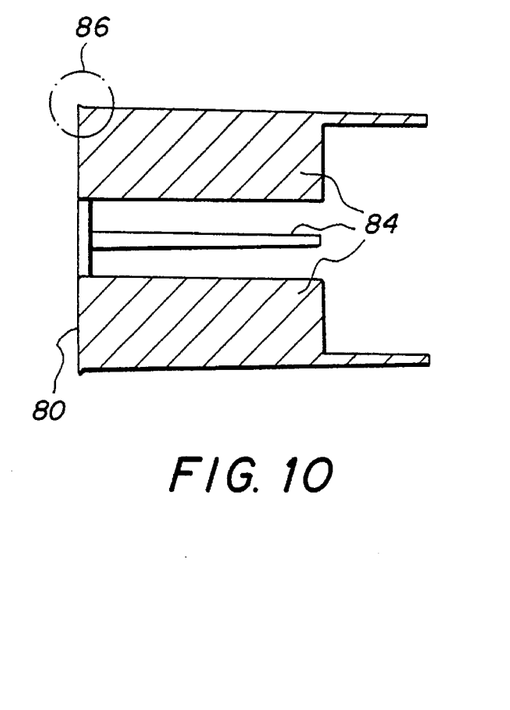
FIG. 10 is a longitudinal cross-sectional view of the core insert shown in FIG. 9.
Figure 11:
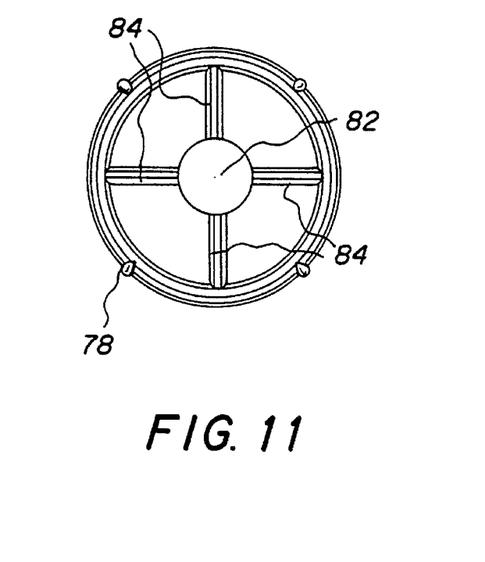
FIG. 11 is a transverse cross-sectional view of the core insert shown in FIG. 9.
Figure 12:
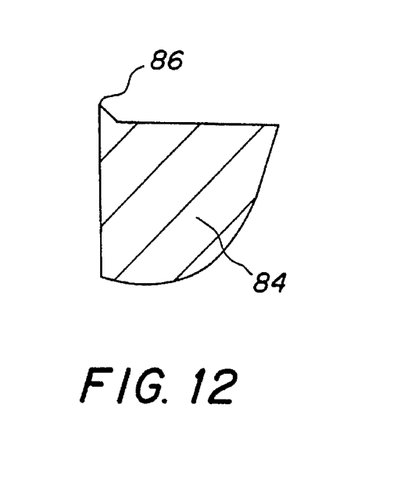
FIG. 12 is an enlarged portion of the view shown in FIG. 10, showing a preferred rim on the outer periphery of the core.

In a second preferred embodiment, as shown in FIG. 8, an open-ended hollow core 74 is provided with a core plug 76 to permit mounting of the roll on a dispensing stand. Plug 76 is formed preferably by molding from metal or preferably plastic such as PVC, polycarbonate, high density polyethylene, or butyrate polymer. As shown in FIGS. 9 through 12, plug 76 is adapted to fit snugly and concentrically into hollow core 74. Preferably, the outer diameter of plug 76 is slightly less than the inner diameter of core 74, and plug 76 is provided on its outer radial surface with a plurality of shallow longitudinal ribs 78 which form an interference fit when the plug is inserted into the core. Ribs 78 can be, for example, 0.007 inches (0.18 mm) in height and 1 inch (25 mm) long. Plug 76 has an integral flush end 80 with an appropriate bore 82 therethrough. To provide structural strength while saving on material, plug 76 is hollow and is provided with a plurality of internal webs 84 which also act as guides and supports for pin 40. Preferably, core plug 76 is provided with a raised rim 86 at the distal outer periphery thereof to assist in centering the plug within the core.

In a method for light-tightly enclosing a roll 14 of photosensitive web material 32 to store and dispense the material for use in a cooperating apparatus, a bag 12 is formed substantially as disclosed in the above-incorporated references, except that no sidewall openings are provided during forming of the bag. The bag has a closable opening in, preferably, the rearward portion 18. A roll of the web material, protected, as by wrapping, from the light, is provided on a core 34 configured as described hereinabove, the core having a flush end 36 with an axial bore 38, and the flush end being either integral with the core or provided by a core plug 76. In the dark, the roll of photosensitive material on its core is unwrapped and inserted into tire bag through the closable opening, and the leading end 29 of the web material is led through, to protrude from, the exit slot 30 in the neck portion of the bag. The roll is positioned within the bag such that the axis of the core is substantially aligned with and orthogonal to central portions of opposite sidewalls of the bag. The closable opening is closed by known means, as by sealing by thermal welding or by adhesive or tape. Pins 40 as described hereinabove are inserted into the axial bores in the core, piercing the bag sidewalls, to a depth wherein the sidewall material is captured and retained by pressure between the shaft flange 44 on the pin and the end of the core. A storage and dispensing stand 52 as described hereinabove is provided. The roll is mounted on the stand with the shoulders 48 of the pins 40 disposed in the saddles 64 of the mounting stand. The stand and mounted roll are then installed in the cooperating apparatus.

The many features and advantages of the invention are apparent from the detailed specification and thus it is intended by the appended claims to cover all such features and advantages which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

PARTS LIST 10 flexible enclosure
12 bag
14 roll of photosensitive web
16 opposite sidewalls of 12
18 rearward portion of 12
20 forward portion of 12
22 upper portion of 12
24 lower portion of 12
26 neck portion of 12
28 distal end of 26
29 leading end of 32
30 exit slot of 12
32 web material of 14
34 core of 14
36 flush end of 34
37 outer diameter of 34
38 axial bore in 36
39 diameter of 38
40 mounting pin
42 shaft of 40
43 diameter of 42
44 flange on 42
46 outer diameter of 44
48 shoulder of 40
50 cap of 40
52 storage and dispensing stand
54 base of 52
56 fold in 54
58 cutouts in 54
60 upright walls of 52
62 upper ends of 60
64 saddles in 62
66 holes in 60 for carrying handles
68 hollow core
70 integral flush end of 68
72 axial bore in 70
74 open-ended hollow core
76 core plug for 74
78 ribs on 76
80 integral flush end on 76
82 axial bore in 80
84 webs in 76
86 raised rim on 76

What is claimed is:

1. A flexible enclosure for storing and dispensing a roll of photosensitive web material for use in cooperating apparatus, said enclosure comprising:

a) a flexible opaque bag configured to enclose the roll, said bag including first and second opposite sidewalls extending between opposing rearward and forward portions and between opposing upper and lower portions, at least one of said sidewalls having a centrally disposed aperture therein, said rearward portion defining a closable opening through which the roll can pass into said bag, said bag further including a shallow neck portion projecting forwardly from said forward portion to a distal end thereof defining an exit slot through which the strip of web material can pass;

b) a cylindrical core within said bag, said core having flush axial ends;

c) a mounting pin disposed coaxially in an end of said core, said pin having a shaft extending outward of said core through said central aperture in said sidewall and having a flange on said shaft, said flange being outside said bag and cooperating with said core to light-tightly capture a portion of said sidewall therebetween, said pin having further a shouldered portion of said shaft adapted to mate with means for storing and dispensing said web from said enclosure.

2. A flexible enclosure in accordance with claim 1 further comprising a second mounting pin disposed in an opposite end of said core and extending through said second opposite sidewall, said second pin having a shaft and a flange on said shaft, said flange being outside said bag and cooperating with said core to light-tightly capture a portion of said second sidewall therebetween, said second pin having further a shouldered portion of said shaft adapted to mate with means for storing and dispensing said web from said enclosure.

3. A flexible enclosure in accordance with claim 1 wherein at least one of said flush axial ends of said core has an axial bore therein.

4. A flexible enclosure in accordance with claim 1 wherein said means for storing and dispensing comprises a stand.

5. A flexible enclosure in accordance with claim 4 wherein said stand further comprises a saddle for receiving said shouldered portion.

6. A flexible enclosure in accordance with claim 1 wherein said bag is made from a plastic material including high density polyethylene.

7. A flexible enclosure in accordance with claim 1 wherein said core includes an integral end.

8. A flexible enclosure in accordance with claim 1 wherein at least one of said flush axial ends of said core includes a core plug.

9. An assembly for storing and dispensing photosensitive web, comprising:
   a) a flexible opaque bag configured to enclose the roll, said bag including first and second opposite sidewalls extending between opposing rearward and forward portions and between opposing upper and lower portions, at least one of said sidewalls having a centrally disposed aperture therein, said rearward portion defining a closable opening through which the roll can pass into said bag, said bag further including a shallow neck portion projecting forwardly from said forward portion to a distal end thereof defining an exit slot through which the strip of web material can pass;
   b) a cylindrical core within said bag, said core having flush axial ends;
   c) a mounting pin disposed coaxially in an end of said core, said pin having a shaft extending outward of said core through said central aperture in said sidewall and having a flange on said shaft, said flange being outside said bag and cooperating with said core to light-tightly capture a portion of said sidewall therebetween, said pin having further a shouldered portion of said shaft adapted to mate with means for storing and dispensing said web from said enclosure; and
   d) an elongated strip of photographic web material wound about said core, a leading end portion of said strip extending from said exit slot.

10. A method for light-tightly enclosing a roll of photosensitive web material to store and to dispense such material for use in cooperating apparatus, the roll including an elongate strip of the web material, said method comprising the steps of:
   a) providing a flexible opaque bag configured to enclose the roll, the bag including opposite sidewalls extending between opposing rearward and forward portions and between opposing upper and lower portions, the rearward portion initially defining a closable opening through which the roll can pass into the bag, and a shallow neck portion projecting forwardly from the forward portion to a distal end thereof defining an exit slot through which the strip of material can pass;
   b) providing a cylindrical core about which the strip of web material has been wound to form a roll, said core having flush ends having an axial bore therein;
   c) inserting said roll into said bag through the closable opening in its rearward portion, and arranging the roll therein so that a leading portion of the web material extends forwardly into the neck portion and out through the exit slot, and so that each core end is axially aligned with and orthogonal to a central portion of said sidewalls;
   d) light-tightly closing the opening in the rearward portion of said bag;
   e) providing mounting pins having a shaft, shaft flange, and shouldered portion of said shaft; and
   f) inserting the shafts of said pins through said sidewalls into said axial bores to a depth such that a portion of the material of each of said sidewalls is light-tightly captured between said flanges and said core ends.

11. A method in accordance with claim 10 further comprising the steps of:
   a) providing a stand having saddles adapted to receive said shouldered portions of said pins; and
   b) disposing said enclosure on said stand with said pins operatively disposed within said saddles to suspend said enclosure for storage and dispensing of web therefrom.

* * * * *